Aug. 28, 1956     E. J. PETERS     2,760,656
VEHICLE UNLOADING APPARATUS
Filed April 13, 1955     2 Sheets-Sheet 1
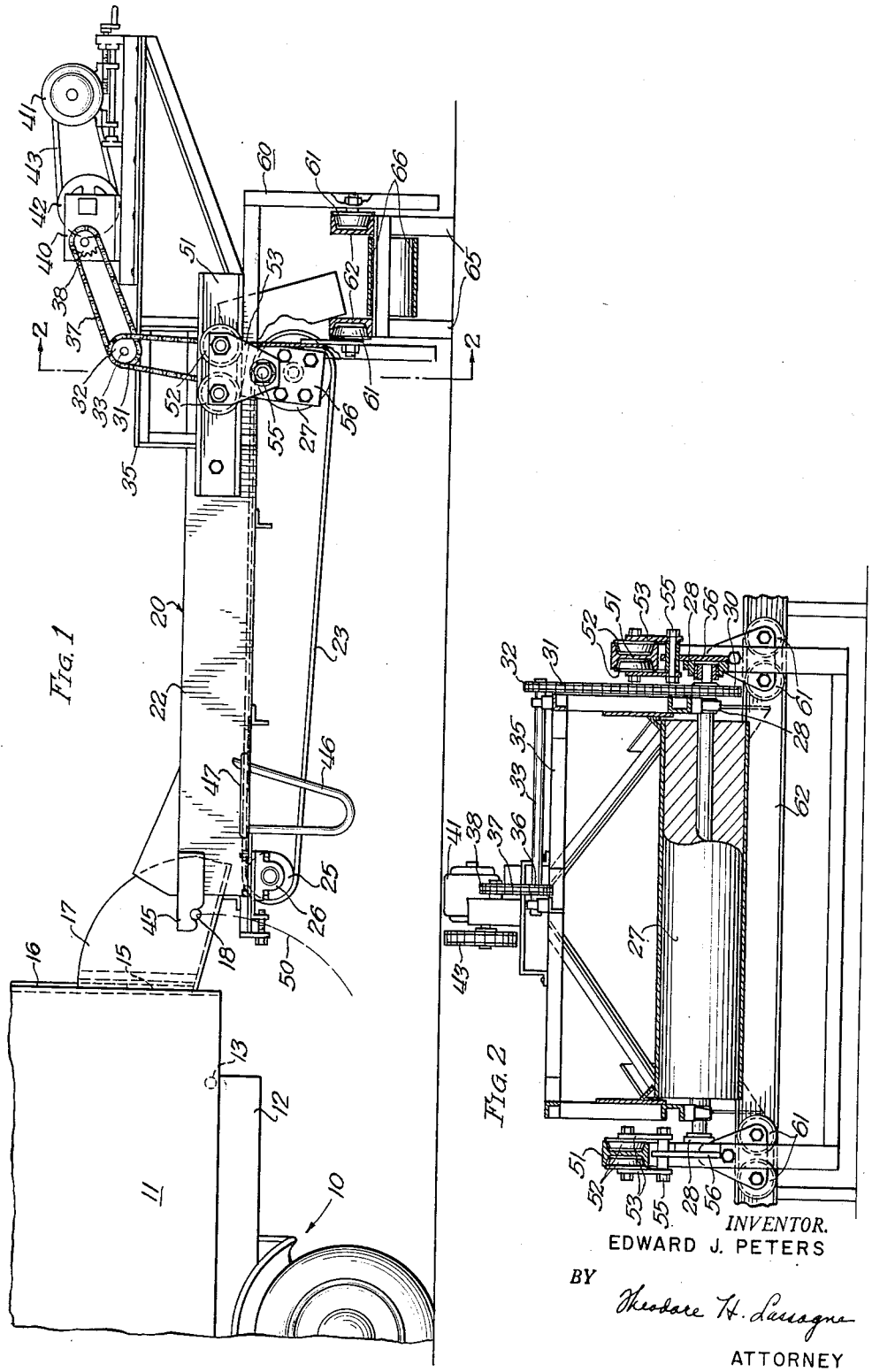
INVENTOR.
EDWARD J. PETERS
BY
*Theodore H. Lasagne*
ATTORNEY Aug. 28, 1956  E. J. PETERS  2,760,656
VEHICLE UNLOADING APPARATUS
Filed April 13, 1955  2 Sheets-Sheet 2

INVENTOR.
EDWARD J. PETERS
BY Theodore H. Lavagne
ATTORNEY

United States Patent Office 2,760,656
Patented Aug. 28, 1956

2,760,656

VEHICLE UNLOADING APPARATUS

Edward J. Peters, Wasco, Calif.

Application April 13, 1955, Serial No. 501,045

1 Claim. (Cl. 214—46)

The present invention relates to improvements in material handling apparatus, and more particularly to improvements in vehicle unloading apparatus of the continuous belt type especially adapted for unloading bulk material such as potatoes or grains from trucks of the tilt-bed type and conveying such material into a processing plant or storage warehouse.

Conveyers of the general type employed in connection with the present invention have previously been used to receive bulk materials manually unloaded from trucks for the purpose of conveying such materials into a processing plant or storage warehouse, but the use of such conveyers to effect the fully automatic unloading of such materials from vehicles such as tilt-bed trucks, without necessitating the use of labor to transfer such materials from vehicle to conveyer, has not been accomplished by previously known arrangements of this character.

The apparatus of the present invention accomplishes such fully automatic unloading and conveying in a practical and efficient manner under the control of a single operator who need only position the truck within relatively broadly defined longitudinal and lateral limits adjacent the conveyer, connect the conveyer to the discharge end of the truck, and elevate the tilting bed of the truck.

In summary, this is accomplished, according to the present invention, by providing a tiltable dump truck body having a discharge opening in one end thereof with trunnion means adjacent the discharge opening, to which trunnion means one end of a longitudinally extending unloading conveyer may be pivotally connected in such a way as to place one end of the conveyer in communication with the discharge opening of the truck body. The opposite end of the conveyer is mounted so as to be longitudinally movable for the double purpose of permitting longitudinal movement of the conveyer as a whole concurrently with the tilting movement of the truck body (which tilting movement necessarily introduces a longitudinal component of movement into the conveyer frame pivotally connected thereto) and also for the purpose of permitting longitudinal movement of the conveyer as a whole to accommodate random longitudinal positioning of the truck within the parking area adjacent the conveyer. The end of the conveyer opposite that connected to the truck body discharges into a second conveyer disposed at a right angle thereto and, in order to accommodate random lateral positioning of the truck within the parking area adjacent the conveyer, the said opposite end is mounted on a carriage structure which may be moved longitudinally of the second conveyer.

The novel structural features of the present invention are defined with particularity in the appended claims. The invention itself, however, together with additional objects and advantages thereof, will be best understood from the following description of a preferred embodiment thereof, reference being had to the accompanying drawings, in which:

Figure 1 is a side elevation of unloading apparatus embodying the present invention;

Figure 2 is a sectional view of the unloading apparatus of Figure 1, the section being taken on the line 2—2 of Figure 1;

Figure 4:
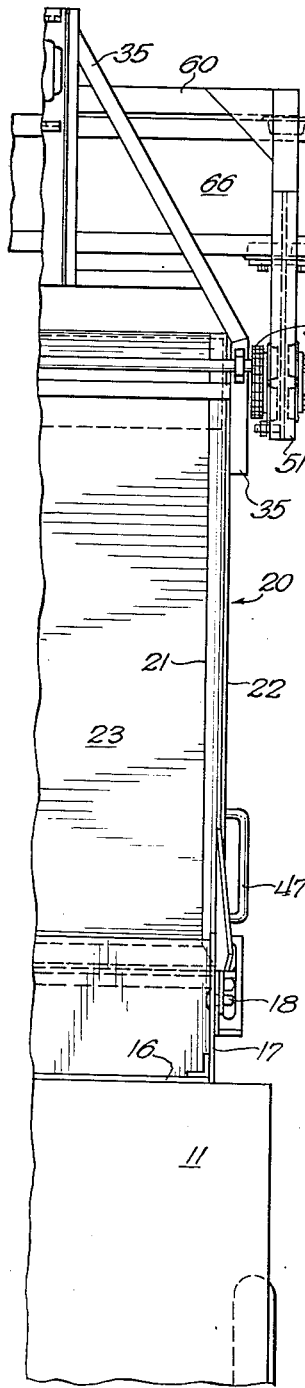
Figure 4 is a partial plan view of said apparatus corresponding to Figure 3 but illustrating the position of the parts after tilting of the truck body.

Referring to Figure 1, the rear portion of the body of a conventional tilt-bed truck is illustrated at 10; the body 11 of the truck being tiltable with respect to the bed or frame 12 around a pivotal center 13 in such a way as to elevate the forward end of the truck body 11 and simultaneously to depress the rear end thereof. The rear end of the body 11 is provided with a discharge opening 15 preferably provided with a sliding door 16 and, according to the present invention, a chute 17 is attached to the rear end of the truck body 11 for the purpose of guiding bulk material such as potatoes or grains from the truck body 11 through the discharge opening 15; the sides of the chute 17 being provided with trunnion means illustrated as in the form of oppositely disposed pins 18 for effecting a pivotal connection with a conveyer as hereinafter described.

A longitudinally extending unloading conveyer 20, adapted to be pivotally connected with said trunnion means, comprises a rectangular frame 21 having upstanding side plates 22 between which moves the upper run of a continuous belt 23 which passes over idler roller 25 rotatable in a journal bearing 26 supported on the end of the frame 21 nearest the truck body and over a driving roller 27 supported in journal bearing 28 adjacent the opposite end of the frame 21.

Driving means are provided for the roller 27 in the form of a sprocket 30 secured to the roller 27 and connected by a chain 31 with a sprocket 32 secured to a jack shaft 33 extending transversely of the conveyer 20 and mounted in suitable bearings on an upward extension 35 of the frame 20. The opposite end of the jack shaft 33 has fixed thereto a sprocket 36 connected by a chain 37 with a sprocket 38 driven through a gear box 40 by a motor 41 mounted on the frame extension 35 and connected to a pulley 42 of the gear box 40 by a belt drive 43.

Means are provided adjacent the end of the conveyer 20 nearest the truck body 11 for effecting a pivotal connection with the trunnion means 18 carried by the truck body. In the form illustrated, this means comprises a pair of oppositely disposed hooks 45 each fixed to one of the side plates 22 of the conveyer 20 and adapted to engage over one of the pins 18. Preferably the hooks 45 are so formed as to cam off of the pins 18 in case the truck is inadvertently driven away without manually disconnecting the hooks 45 from the pins 18.

The frame 21 is also provided with a pair of oppositely disposed legs 46 and with lifting handles 47 to permit it to be connected to and disconnected from the truck body as above described and rested upon the floor on the ends of the legs 46 without resting the lower reach of the belt 23 upon the floor.

A support is provided for the opposite end of the conveyer whereby longitudinal movement of the conveyer incident to the pivotal movement of the other end thereof with respect to the truck body may be accompanied by longitudinal movement of the entire frame 22. The desirability of this arrangement will be clear from a consideration of Figure 1 of the drawing, from which it appears that as the truck body 11 pivots around the center 13, the pins 18 will move downwardly along a curved line 50, thus causing the pins 18 to move leftwardly as the apparatus is viewed in Figure 1 and requiring that the entire frame 21 of the conveyer 20 move leftwardly a corresponding amount when the hooks 45 are pivotally engaged with the pins 18. This support for the right end of the conveyer as the same is viewed in Figure 1, comprises a pair of longitudinally extending rails 51 disposed on opposite sides of the conveyer 20 and means illustrated as a pair of rollers 52 disposed on each side of the conveyer 20, which are carried upon the rails 51 and longitudinally movable therealong, and which support the end of the conveyer 20 by suspending the same through plates 53 connected by pivot pins 55 from which in turn are pivotally suspended plates 56 carrying the journal bearings 28 for the roller 27. This arrangement is such that due to the rolling movement of the rollers 52 along the rails 51, the entire conveyer 20 is free to move longitudinally as an incident to pivotal movement of the end thereof which is pivotally connected to the truck body and may also be moved longitudinally in the same way to permit it to be connected to and disconnected from the truck body notwithstanding the random longitudinal positioning of the truck body with respect to the conveyer within relatively broad limits. In this connection, it is important to note that the rollers 52 are mounted upon the rails 51 with sufficient free play so that the frame 21 may be moved angularly from side to side to engage a truck backed in at a slight angle, thus avoiding any binding at the pivotal connection between the hooks 45 and pins 18 or any binding of the rollers 52 upon the rails 51.

In order to permit lateral movement of the conveyer 20 to accommodate random lateral positioning of the truck body with respect to it, within relatively broad limits, the rails 51 are mounted upon a carriage structure 60 provided with pairs of rollers 61 supporting said carriage structure for movement in a path at a right angle to the direction in which the conveyer 20 extends, along a pair of rails 62 carried by a frame 65 standing on the floor of the processing shed or warehouse and also supporting a second conveyer 66 which also is preferably of the endless belt type and which extends transversely with respect to the first mentioned conveyer 20; being disposed adjacent the end of the conveyor 20 opposite that connected to the truck 11. This arrangement is such that the entire frame 60 together with the conveyer 20 mounted thereon, as previously described, may be moved along rails 62 whereby random lateral positioning of the truck body 11 with respect to the conveyer 20 may be accommodated by lateral movement of the conveyer 20 while maintaining communication between the conveyer 20 and the conveyer 66.

In operation of the apparatus of the present invention a fleet of trucks usually numbering six to eight trucks for each unloading conveyer are used, it being necessary to use approximately this number of trucks for each unloader in order to keep the unloading apparatus in substantially continuous operation. The number vaires, however, according to the distance from the field where the produce is loaded to the shed where it is to be processed or stored. The produce is loaded in bulk into the trucks in the field, and each truck is then backed into the processing shed or warehouse adjacent the unloading conveyer. The operator then lifts the free end of unloading conveyer and places the hooks 45 on the pins 18 projecting from the sides of the chute 17. If the truck is not laterally aligned with the conveyer, he may move the carriage 60 along the rails 62 to properly position the conveyer 20 with respect to the truck, and if the truck is not back far enough or is backed in too far, he may move the conveyer 20 fore and aft along the rails 51 until the pivotal connection between the hooks 45 and pins 18 can be easily established.

When the unloading conveyer is thus connected to the truck, the operator then merely hoists the front end of the truck body either by hoisting mechanism forming a part of the truck or by an electric winch which may be removably connected to the front end of the truck body. As the truck body tilts, the sliding door 16 covering the discharge opening 15 in the rear of the truck body is opened, permitting the produce to flow out onto the upper reach of the belt 23, and upon operation of the motor 41, to be carried on to the second conveyer 66 by which it is conveyed to processing stations or to storage.

Figure 3:
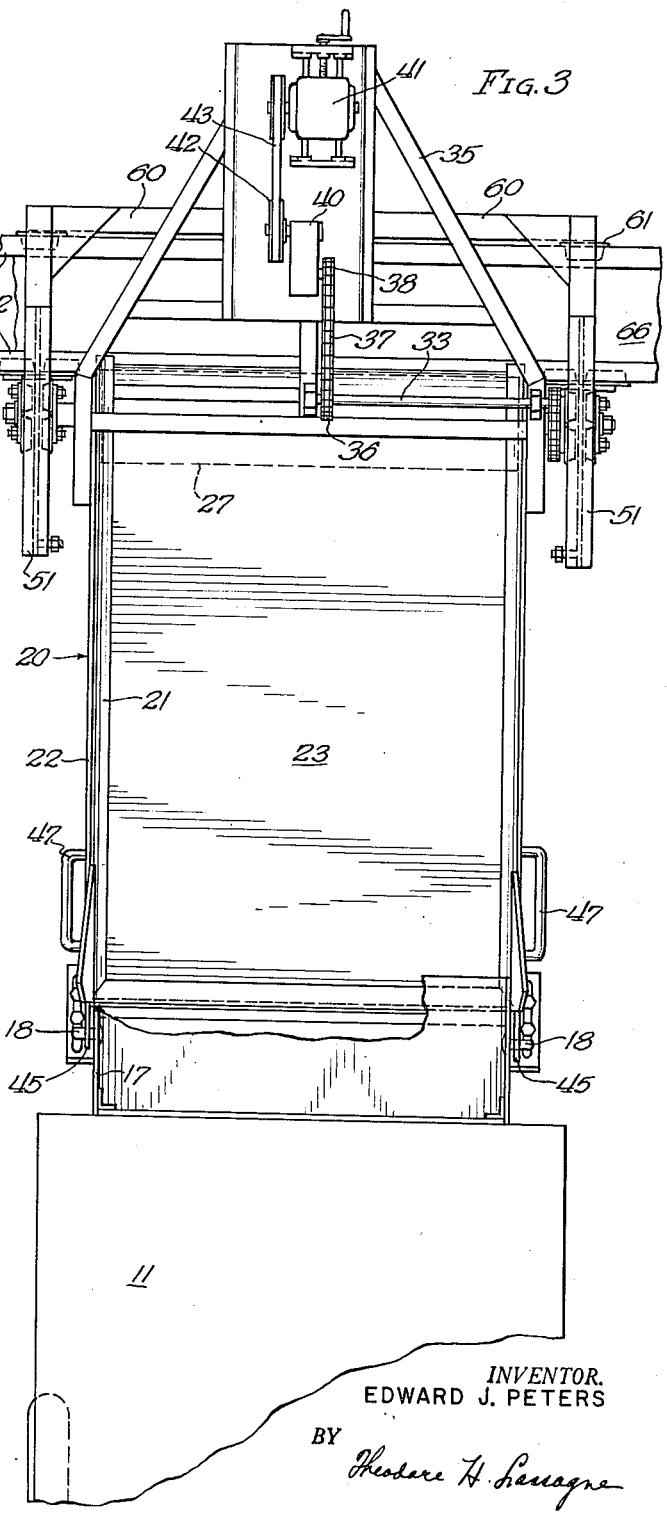
Figure 3 is a plan view of the apparatus of Figure 1 prior to the tilting of the truck body.

As the unloading of the truck progresses, the operator from time to time raises the front end of the truck higher and higher, and it should be noted that as it is done, not only does the angle of the conveyer 20 change, as permitted by the pivotal mounting 55, but due to the location of the pivot 13 on which the truck body is tipped, the conveyer 20 moves leftwardly, as viewed in Figure 1, from the relative position illustrated in Figure 3 of the drawings to the relative position illustrated in Figure 4; this movement being permitted by the suspension of the conveyer frame 21 on rollers 52 from rails 51.

It is thus seen that the unloading apparatus of the present invention provides an efficient and economical means whereby the fully automatic unloading of bulk produce from vehicles to processing stations or storage may be accomplished by only a single operator without necessitating manual handling of the produce at any stage.

What is claimed is:

The combination with a tiltable dump truck body having a discharge opening therein and trunnion means carried by said body adjacent said opening, of a longitudinally extending unloading conveyer having means adjacent one end thereof for effecting a pivotal connection with said trunnion means, a support for the opposite end of said conveyer comprising a carriage including a pair of longitudinally extending rails disposed on opposite sides of said conveyer, and means carried upon said rails and longitudinally movable therealong for supporting the said opposite end of said conveyer; whereby longitudinal movement of said conveyer incident to pivotal movement of the said one end thereof with respect to said truck body may be accompanied by longitudinal movement of said rail-carried means, and random longitudinal positioning of said truck body with respect to said conveyer may likewise be accommodated by longitudinal movement of said rail-carried means; and means supporting said carriage for movement at a right angle to the direction in which said conveyer extends comprising a pair of transversely extending rails and means on said carriage carried by said last named rails and movable therealong.

References Cited in the file of this patent

UNITED STATES PATENTS

| 816,017 | Jones | Mar. 27, 1906 |
| 2,558,629 | Smida | June 26, 1951 |
| 2,584,069 | Wall | Jan. 29, 1952 |
| 2,627,960 | Eberle | Feb. 10, 1953 |